(12) United States Patent
Gupta et al.

(10) Patent No.: US 12,017,887 B2
(45) Date of Patent: Jun. 25, 2024

(54) WATER DETECTION INSIDE ELEVATOR PIT

(71) Applicant: Otis Elevator Company, Farmington, CT (US)

(72) Inventors: Ankit Anand Gupta, Uttar Pradesh (IN); Stella M. Oggianu, Farmington, CT (US); Girisha DJ, Karnataka (IN); Arangarajan P, Karnataka (IN); Anup Kumar, Mysuru (IN)

(73) Assignee: OTIS ELEVATOR COMPANY, Farmington, CT (US)

( * ) Notice: Subject to any disclaimer, the term of this patent is extended or adjusted under 35 U.S.C. 154(b) by 1311 days.

(21) Appl. No.: 16/578,632

(22) Filed: Sep. 23, 2019

(65) Prior Publication Data

US 2020/0095091 A1     Mar. 26, 2020

(30) Foreign Application Priority Data

Sep. 24, 2018   (IN) .............................. 201811035840

(51) Int. Cl.
| | |
|---|---|
| *B66B 5/00* | (2006.01) |
| *B66B 1/34* | (2006.01) |
| *B66B 3/00* | (2006.01) |
| *B66B 5/02* | (2006.01) |
| *G01S 17/04* | (2020.01) |

(Continued)

(52) U.S. Cl.
CPC .......... *B66B 5/0031* (2013.01); *B66B 1/3461* (2013.01); *B66B 3/002* (2013.01); *B66B 5/021* (2013.01); *G01S 17/04* (2020.01); *G01V 8/12* (2013.01); *G08B 7/06* (2013.01)

(58) Field of Classification Search
CPC ..... B66B 1/3461; B66B 3/002; B66B 5/0018; B66B 5/0031; B66B 5/021; B66B 5/022; G01S 17/04; G01V 8/12; G08B 7/06
See application file for complete search history.

(56) References Cited

U.S. PATENT DOCUMENTS

| | | | |
|---|---|---|---|
| 6,321,876 B1 | 11/2001 | Kawai et al. | |
| 6,812,846 B2 * | 11/2004 | Gutta | ........................ G06T 7/97 |
| | | | 340/603 |

(Continued)

FOREIGN PATENT DOCUMENTS

| | | |
|---|---|---|
| CN | 101934964 B | 1/2011 |
| CN | 102230884 A | 11/2011 |

(Continued)

OTHER PUBLICATIONS

Huotari, CN 108016959, machine translation. (Year: 2018).*

(Continued)

*Primary Examiner* — Hung Q Nguyen
*Assistant Examiner* — Mark L. Greene
(74) *Attorney, Agent, or Firm* — CANTOR COLBURN LLP (57) ABSTRACT

A method of detecting water within a pit of an elevator shaft including: emitting an electromagnetic wave from an electromagnetic wave source towards a bottom of an elevator shaft; detecting a reflected electromagnetic wave of the electromagnetic wave using an electromagnetic wave detector; and determining whether water is present within the pit of the elevator shaft in response to the reflected electromagnetic wave.

14 Claims, 5 Drawing Sheets

(51) Int. Cl.
*G01V 8/12* (2006.01)
*G08B 7/06* (2006.01)

(56) References Cited

U.S. PATENT DOCUMENTS

| | | | |
|---|---|---|---|
| 6,866,089 B2 | 3/2005 | Avila | |
| 7,768,412 B2 | 8/2010 | Vokey | |
| 7,814,582 B2* | 10/2010 | Reddy | E03D 5/10 |
| | | | 4/313 |
| 8,051,955 B2 | 11/2011 | Therriault | |
| 8,796,627 B2* | 8/2014 | Rockwell | G01N 21/55 |
| | | | 250/341.8 |
| 9,143,740 B2 | 9/2015 | Hansen et al. | |
| 9,819,881 B2* | 11/2017 | Terashima | G01N 21/3151 |
| 10,067,071 B2* | 9/2018 | O'Dell | G08B 5/36 |
| 2006/0191324 A1 | 8/2006 | Garabedian et al. | |
| 2020/0348183 A1* | 11/2020 | Agarwal | G01J 5/12 |

FOREIGN PATENT DOCUMENTS

| | | |
|---|---|---|
| CN | 102372207 B | 3/2012 |
| CN | 202279588 U | 6/2012 |
| CN | 202369219 U | 8/2012 |
| CN | 204173701 U | 2/2015 |
| CN | 205772591 U | 12/2016 |
| CN | 207209654 U | 4/2018 |
| CN | 108016959 A | 5/2018 |
| EP | 3643667 A1 | 4/2020 |
| JP | S6421334 A | 1/1989 |
| JP | H09037550 A | 2/1997 |
| JP | H09255253 A | 9/1997 |
| JP | 2008290842 A | 12/2008 |
| KR | 1020180023478 A | 3/2018 |

OTHER PUBLICATIONS

Chinse Office Action for Application No. 201910898200.6; dated Sep. 10, 2022; 9 Pages.
European Search Report for Application No. 19199368.2; dated Mar. 20, 2020; 7 Pages.
Indian Office Action for Application No. 20181135840; dated Apr. 19, 2021; 7 Pages.
Lo, S. et al. "Visual Sensing for Urban Flood Monitoring", Sensors 2015, 15, 20006-20029; doi:10.3390/s150820006.
Nazir, F. et al. "Flood Detection/Monitoring Using Adjustable Histogram Equalization Technique", The Scientific World Journal, vol. 2014, Article ID 809636, http://dx.doi.org/10.1155/2014/809636, 5 Pages.
Chinese Application No. 201910898200.6, Reexamination Notice dated Nov. 1, 2023, 6 Pages.
Qinghua et al., "Modern Traffic Electronic Control Technology", Xiandai Jiaotong Dianzi Kongzhi Jishu, NEFUP, Mar. 1, 2004. (English Abstract).

* cited by examiner

WATER DETECTION INSIDE ELEVATOR PIT

CROSS-REFERENCE TO RELATED APPLICATIONS

This application claims the benefit of Provisional Indian Application No. 201811035840 filed Sep. 24, 2018, which is incorporated herein by reference in its entirety.

BACKGROUND

The subject matter disclosed herein relates generally to the field of elevator systems, and specifically to a method and apparatus for detecting water within a pit of an elevator shaft.

Occasionally, water may migrate into an elevator shaft and collect in a pit (i.e., bottom portion) of the elevator shaft. The collection of water within a pit of an elevator shaft may not be an immediate concern but over time extended periods of water collection and/or specific amounts of water may require the water to be removed. Conventionally, water collecting within the pit of the elevator shaft is discovered by an elevator technician typically inspecting the elevator system for other reasons unrelated to the collection of water.

BRIEF SUMMARY

According to an embodiment, a method of detecting water within a pit of an elevator shaft is provided. The method including: emitting an electromagnetic wave from an electromagnetic wave source towards a bottom of an elevator shaft; detecting a reflected electromagnetic wave of the electromagnetic wave using an electromagnetic wave detector; and determining whether water is present within the pit of the elevator shaft in response to the reflected electromagnetic wave.

In addition to one or more of the features described herein, or as an alternative, further embodiments may include that determining whether water is present within the pit of the elevator shaft in response to the reflected electromagnetic wave further includes: comparing the reflected electromagnetic wave to the electromagnetic wave emitted from the electromagnetic wave source.

In addition to one or more of the features described herein, or as an alternative, further embodiments may include that determining whether water is present within the pit of the elevator shaft in response to the reflected electromagnetic wave further includes: comparing the reflected electromagnetic wave to stored reflected electromagnetic waves.

In addition to one or more of the features described herein, or as an alternative, further embodiments may include: transmitting a notification to a computing device in response to whether water is present within the pit of the elevator shaft.

In addition to one or more of the features described herein, or as an alternative, further embodiments may include: activating an alarm on the computing device in response to the notification.

In addition to one or more of the features described herein, or as an alternative, further embodiments may include that the electromagnetic wave is light.

In addition to one or more of the features described herein, or as an alternative, further embodiments may include that the electromagnetic wave is visible light.

In addition to one or more of the features described herein, or as an alternative, further embodiments may include that the electromagnetic wave is infrared light.

In addition to one or more of the features described herein, or as an alternative, further embodiments may include that the electromagnetic wave source is a light source and the electromagnetic wave detector is a camera.

In addition to one or more of the features described herein, or as an alternative, further embodiments may include: determining a circularity of a spot of light reflection; and determining whether water is present within the pit of the elevator shaft in response to the circularity of the post of light reflection.

According to another embodiment, a water detection system for detecting water within a pit of an elevator shaft is provided. The method including: an electromagnetic wave source configured to emit an electromagnetic wave towards a bottom of an elevator shaft; an electromagnetic wave detector configured to detect a reflected electromagnetic wave of the electromagnetic wave; and a controller configured to determine whether water is present within the pit of the elevator shaft in response to the reflected electromagnetic wave.

In addition to one or more of the features described herein, or as an alternative, further embodiments may include that the controller may determine whether water is present within the pit of the elevator shaft by: comparing the reflected electromagnetic wave to the electromagnetic wave emitted from the electromagnetic wave source.

In addition to one or more of the features described herein, or as an alternative, further embodiments may include that the controller may determine whether water is present within the pit of the elevator shaft by: comparing the reflected electromagnetic wave to stored reflected electromagnetic waves.

In addition to one or more of the features described herein, or as an alternative, further embodiments may include that the controller is configured to transmit a notification to a computing device in response to whether water is present within the pit of the elevator shaft.

In addition to one or more of the features described herein, or as an alternative, further embodiments may include that the controller is configured to activate an alarm on the computing device in response to the notification.

In addition to one or more of the features described herein, or as an alternative, further embodiments may include that the electromagnetic wave is light.

In addition to one or more of the features described herein, or as an alternative, further embodiments may include that the electromagnetic wave is visible light.

In addition to one or more of the features described herein, or as an alternative, further embodiments may include that the electromagnetic wave is infrared light.

In addition to one or more of the features described herein, or as an alternative, further embodiments may include that the electromagnetic wave source is a light source and the electromagnetic wave detector is a camera.

In addition to one or more of the features described herein, or as an alternative, further embodiments may include that the controller is configured to determine a circularity of a spot of light reflection and determine whether water is present within the pit of the elevator shaft in response to the circularity of the post of light reflection.

Technical effects of embodiments of the present disclosure include detecting water within a pit of an elevator system utilizing image processing.

The foregoing features and elements may be combined in various combinations without exclusivity, unless expressly indicated otherwise. These features and elements as well as the operation thereof will become more apparent in electromagnetic wave source of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
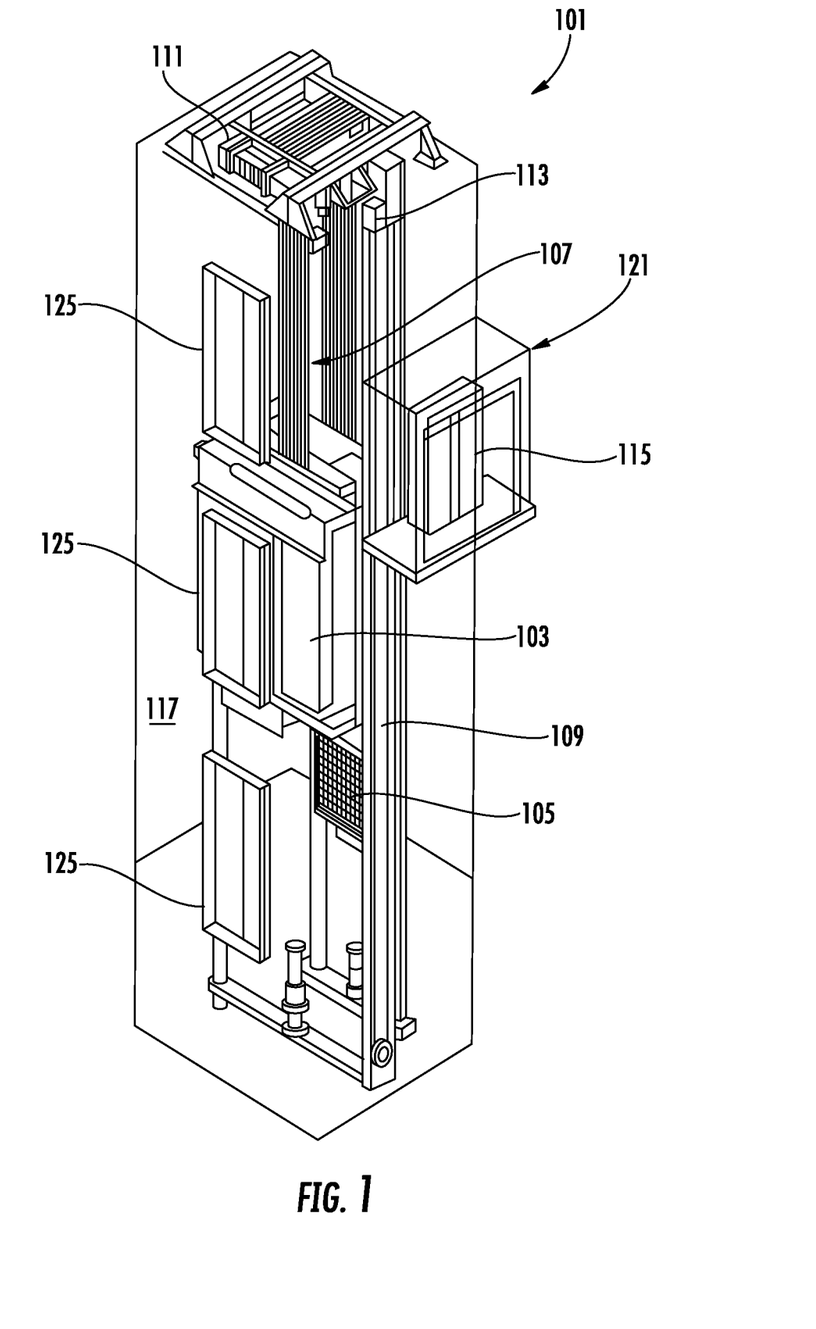
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

Figure 2:
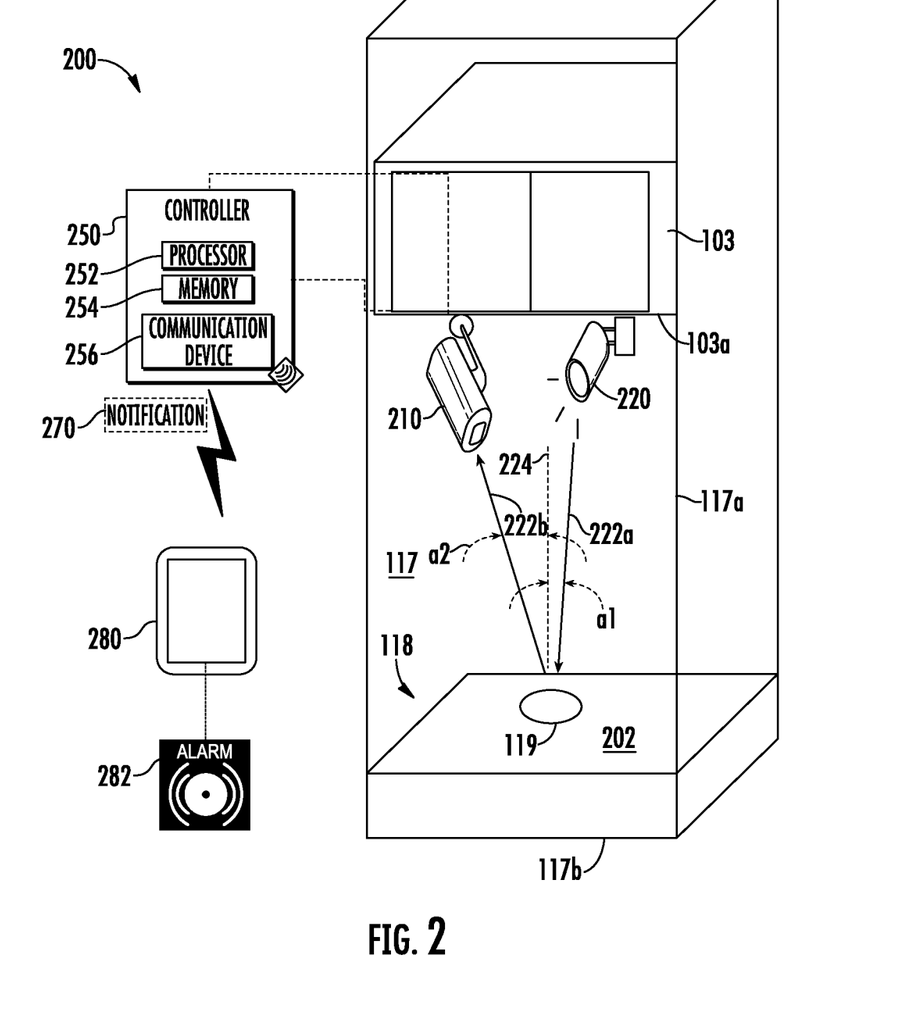
FIG. 2 illustrates a schematic view of a water detection system for the elevator system of FIG. 1, in accordance with an embodiment of the disclosure.

Referring now to FIG. 2 with continued reference to FIG. 1, a water detection system 200 for the elevator system 101 of FIG. 1 is illustrated, according to an embodiment of the present disclosure. Occasionally, water 202 may migrate into an elevator shaft 117 and collect in a pit 118 (i.e., bottom portion) of the elevator shaft 117. The collection of water 202 within a pit 118 of an elevator shaft 117 may not be an immediate concern but over time extended periods of water 202 collection and/or specific amounts of water 202 may require the water 202 to be removed. Conventionally, water 202 collecting within the pit 118 of the elevator shaft 117 is discovered by an elevator technician typically inspecting the elevator system 101 for other reasons unrelated to the collection of water 202.

As shown in FIG. 2, the water detection system 200 comprises an electromagnetic wave detector 210 and an electromagnetic wave source 220. It should be appreciated that, although particular systems are separately defined in the schematic block diagrams, each or any of the systems may be otherwise combined or separated via hardware and/or software. In an embodiment, the electromagnetic wave source 220 may be a light source and electromagnetic wave detector 210 may be a camera. The camera may be utilized for other purposes, such as, for example, detecting the condition of the pit 118 through manual and/or automated detection. In an embodiment, the light source may emit visible and/or infrared light and the camera may be able to detect the visible and/or infrared light.

The electromagnetic wave detector 210 and the electromagnetic wave source 220 may be mounted on the bottom 103a of the elevator car 103. In an embodiment, at least one of the electromagnetic wave detector 210 and the electromagnetic wave source 220 is mounted to the bottom of the elevator car 103. The electromagnetic wave detector 210 and the electromagnetic wave source 220 may be in electronic communication with each other and may also be in electronic communication with a controller 250. The electronic communication between the electromagnetic wave detector 210, the electromagnetic wave source 220, and the controller 250 may be hardwired and/or wireless. The controller 250 may perform other tasks in addition to the detection of water 202 within the pit. In an embodiment, the controller 250 may be the controller 115 of the elevator system 101. In an embodiment, the controller 250 may be any other controller located locally or in the cloud. In an embodiment the electromagnetic wave detector 210 and the electromagnetic wave source 220 are hardwired to the controller 250 and the controller 250 is the controller 115 of the elevator system 101. In another embodiment, the controller 250 may be located within at least one of the electromagnetic wave detector 210 and the electromagnetic wave source 220. In another embodiment, the controller 250, the electromagnetic wave source 220, and the electromagnetic wave detector 210 may be combined into a single component. In another embodiment, the controller 250, the electromagnetic wave source 220, and the electromagnetic wave detector 210 may each be separate components. Advantageously, if at least the electromagnetic wave source 220 is separate from the electromagnetic wave detector 210 then the electromagnetic wave source 220 may be plugged into an existing elevator system already having an electromagnetic wave detector 210 and the electromagnetic wave detector 210 may be reprogrammed in the controller 115 of the elevator system 101 to operate with an added electromagnetic wave source 220 to detect water 202 within the pit 118 of the elevator shaft 117.

The controller 250 may be an electronic controller including a processor 252 and an associated memory 254 comprising computer-executable instructions (e.g., detection algorithm 256) that, when executed by the processor 252, cause the processor 252 to perform various operations. The processor 252 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 254 may be but is not limited to a random access memory (RAM), read only memory (ROM), or other electronic, optical, magnetic or any other computer readable medium.

The computer-executable instructions stored within memory 254 of the controller 250 includes a detection algorithm 256. The controller 250 is configured to control and coordinate the operation of the electromagnetic wave detector 210 and the electromagnetic wave source 220. The electromagnetic wave source 220 is configured to emit an electromagnetic wave 222a and the electromagnetic wave detector 210 is configured to detect a reflected electromagnetic wave 222b of the electromagnetic wave 222a being reflected off of surfaces within the elevator shaft 117 including but not limited to walls 117a of the elevator shaft 117, a bottom 117b of the elevator shaft 117, and water 202 within the elevator shaft 117. In an embodiment, the electromagnetic wave 222a and the reflected electromagnetic wave 222b may be at least one of light, visible light, and infrared light.

The electromagnetic wave source 220 may be oriented at a specific angle of incidence α1 relative to a perpendicular line 224 that is perpendicular (i.e., normal) to the bottom 117b of the elevator shaft 117. The electromagnetic wave detector 210 may be oriented at a specific angle of reflection α2 relative to a perpendicular line 224 that is perpendicular (i.e., normal) to the bottom 117b of the elevator shaft 117. In an embodiment, the angle of incidence al may between about 0-10° relative to a perpendicular line 224. In another embodiment, the angle of incidence al may between about 0° relative to a perpendicular line 224. The detection algorithm 256 may be configured to analyze the reflected electromagnetic wave 222b detected by the electromagnetic wave detector 210 to the electromagnetic wave 222a transmitted from the electromagnetic wave source 220. For example, if the electromagnetic wave 222a transmitted is visible light, the detection algorithm 256 is configured to localize the reflection spot of the reflected electromagnetic wave 222b on the water 202 or bottom 117b of the elevator shaft 117 then extract the image features to determine whether or not water 202 is present in frame. The controller 250 may also be configured to determine whether water 202 is present within the pit 118 by: analyzing the reflected electromagnetic wave 222b and the electromagnetic wave 222a emitted from the electromagnetic wave source 220. The analysis may include detecting a spot of light reflection 119, looking for the circularity of the spot of light reflection 119 and if the circularity of the spot of light reflection 119 meets a defined threshold (e.g., 60% circularity, the detection algorithm 256 may determine that water 202 is present in frame.

The controller 250 may be configured to transmit a notification 270 to a computing device 280 in response to whether water 202 is detected within the pit 118 of the elevator shaft 117. The notification 270 may be transmitted to a cloud computing network from the transmission to the computing device 280. The transmission between the controller 250 and the computing device 280 may be wired and/or wireless. Communication between the controller 250 and computing device 280 may be bidirectional communication. The computing device 280 can be used to reset the set notification, update firmware and requesting event logs, etc. The notification 270 may be in the form of a text message, email, application alert, alarm, etc. The computing device 280 a computing device such as a desktop computer. The computing device 280 may also be a mobile computing device that is typically carried by a person, such as, for example a phone, PDA, smart watch, tablet, laptop, etc. The computing device 280 may also be two separate devices that are synced together such as, for example, a cellular phone and a desktop computer synced over an internet connection. The computing device 280 may be configured to activate an alarm 282 in response to the notification 270. The alarm 282 may be audible, vibratory, and/or visual. The alarm 282 may alert a user of the computing device 280 as to whether water 202 is present in the pit 118.

Figure 3:
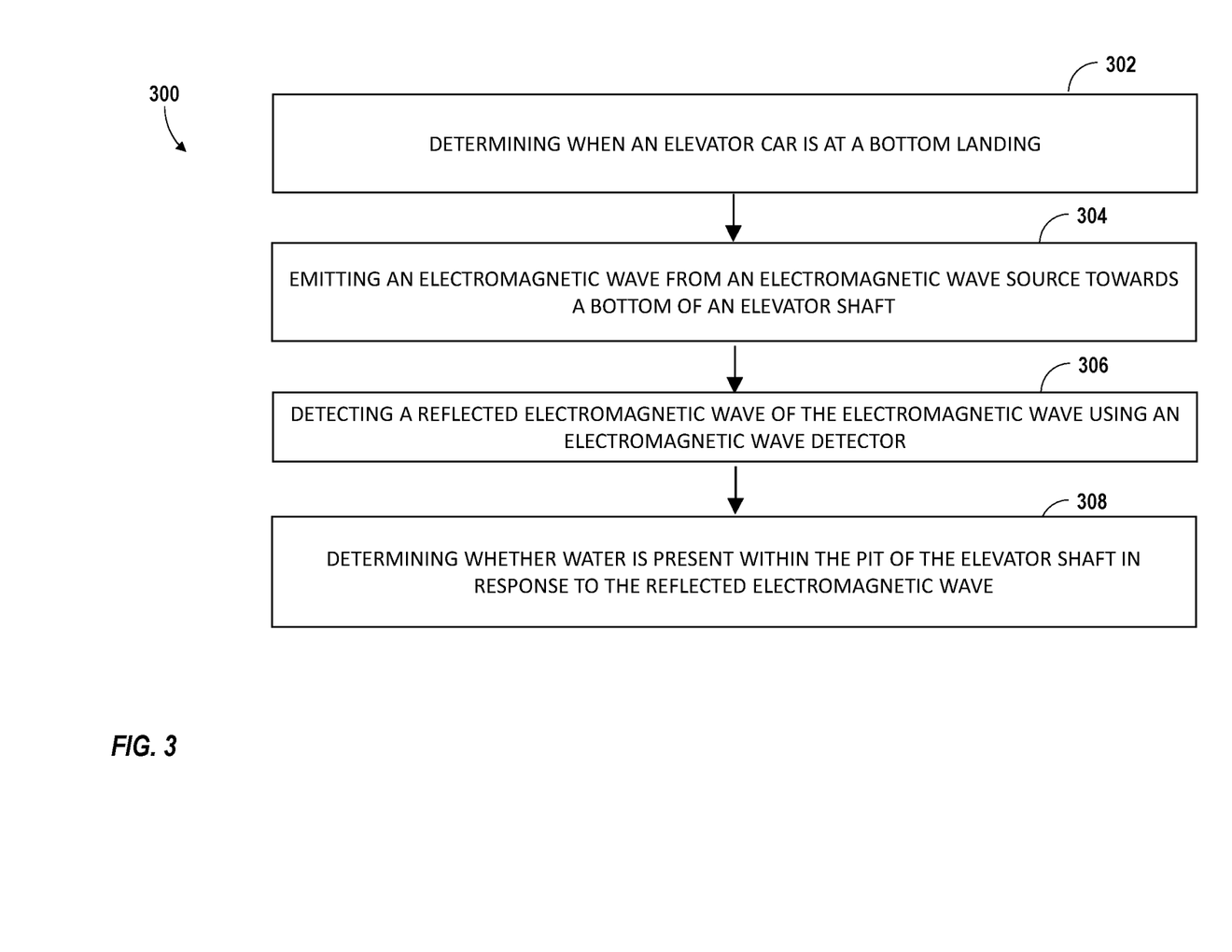
FIG. 3 is a flow chart of method of detecting water within a pit of a shaft of the elevator system of FIG. 1, in accordance with an embodiment of the disclosure.
Figure 3A:
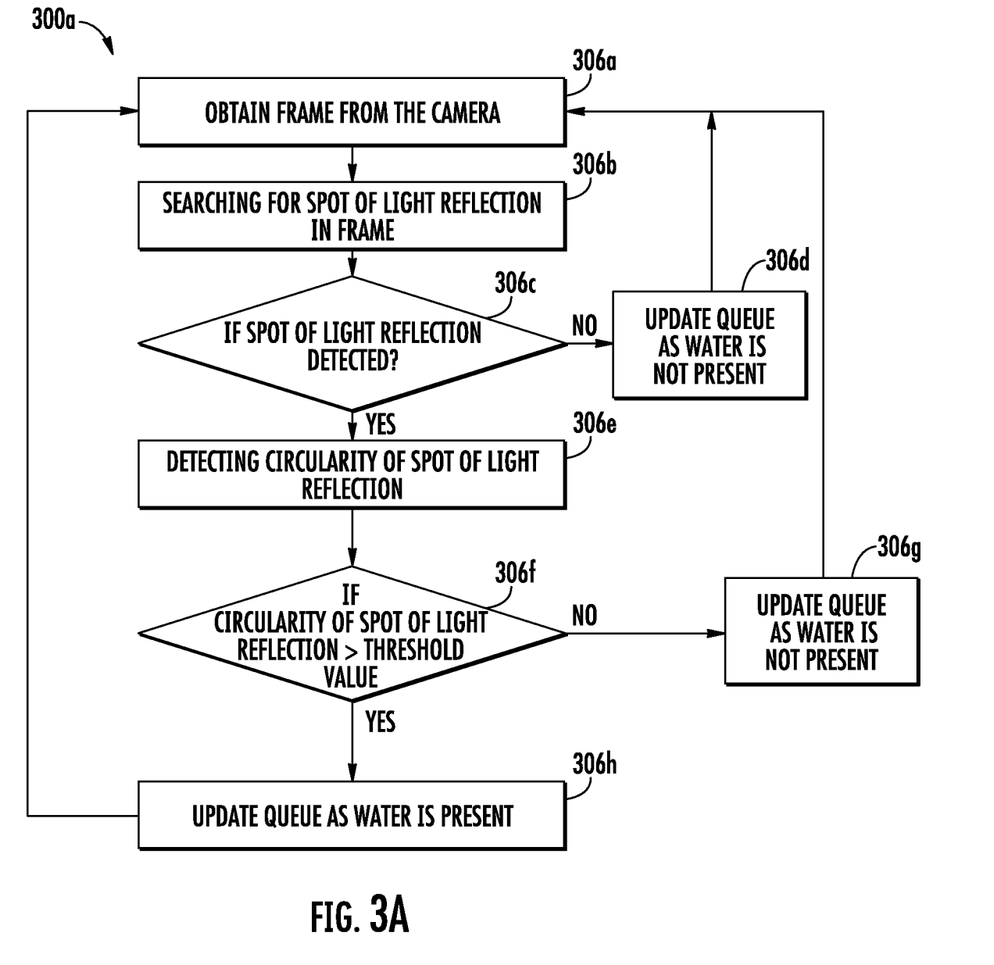
FIG. 3A is a flow chart of a method of detecting a reflected electromagnetic wave using an electromagnetic wave detector, in accordance with an embodiment of the disclosure.
Figure 3B:
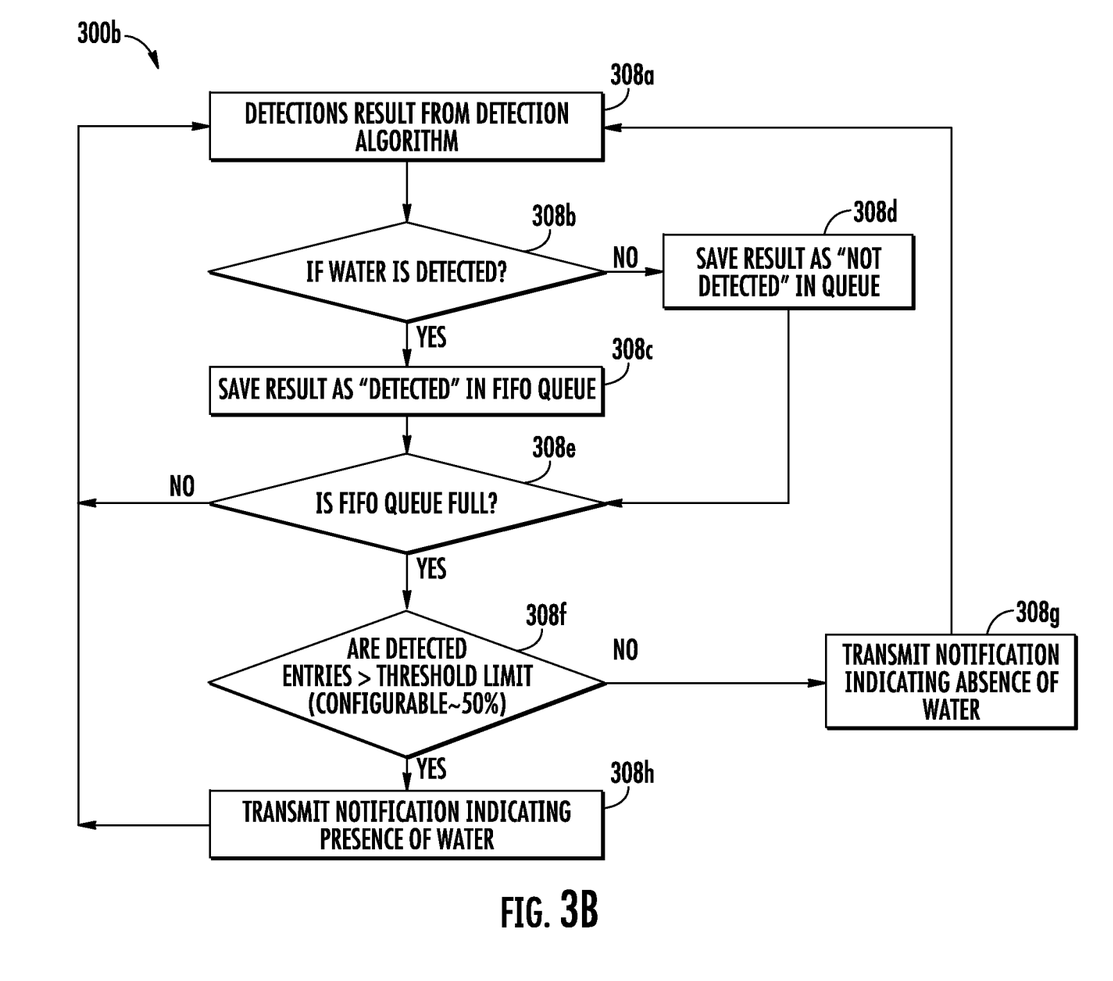
FIG. 3B is a flow chart of a method of determining whether water is present within the pit in response to the reflected electromagnetic wave, in accordance with an embodiment of the disclosure.

Referring now to FIGS. 3, 3a, and 3b, while referencing components of FIGS. 1-3. FIG. 3 shows a flow chart of method 300 of detecting water 202 within a pit 118 of an elevator shaft 117. In an embodiment, the method 300 may be performed by the elevator system 101. The method 300 may be prompted by first determining when the elevator car 103 is at a bottom landing 125 of the elevator shaft 117. The controller 115 of the elevator system 101 communicate with the controller 250 to determined when the elevator car 103 is at the bottom landing 125 of the elevator shaft 117. The detection algorithm 256 may initiate when the elevator car 103 is at a bottom landing 125. The bottom landing 125 may be a landing nearest to the bottom 117b of the elevator shaft 117 or a landing 125 at a height where the electromagnetic wave detector 210 may perform accurately (e.g., depending upon the capability of the electromagnetic wave detector 210 and the height of the water 202, the bottom landing 125 may not be the physical bottom landing 125 of the elevator shaft 117 but rather any landing 125 where the electromagnetic wave detector 210 may perform accurately. At block 304, an electromagnetic wave 222*a* is emitted from an electromagnetic wave source 220 towards a bottom 117*b* of an elevator shaft 117.

At block 306, a reflected electromagnetic wave 222*b* of the electromagnetic wave 222*a* is detected using an electromagnetic wave detector 210. FIG. 3*a* shows a flow chart of a method 300*a* of detecting a reflected electromagnetic wave 222*b* using an electromagnetic wave detector 210. In the example of FIG. 3*a* the electromagnetic wave detector 210 is a camera configured to detect light. In an embodiment, the method 300*a* may be performed by the detection algorithm 256. At block 306*a*, a frame from the camera is obtained. At block 306*b*, a spot of light reflection 119 is searched for within the frame from the camera. At block 306*c*, if spot of light reflection 119 is not detected then the method 300*a* moves to block 306*d* to queue and return back to block 306*a* because water 202 is not present in frame. The queue may be an active list of each frames from the camera and an indication of whether water 202 was detected in each frame. The queue is analyzed as a whole in FIG. 3*b* and method 300*b*. At block 306*c*, if a spot of light reflection 119 is detected then the method 300*a* moves to block 306*e* where a circularity of the spot of light reflection 119 is detected. The circularity of the spot of light reflection 119 may indicate whether or not water 202 is present in the pit 118. In one embodiment, the threshold value may be 60% circularity. At block 306*f*, if the circularity of the spot of light reflection 119 is greater than a threshold value then the method 300*a* moves to block 306*h* but if the circularity of the spot of light reflection 119 is not greater than the threshold value the method 300*a* moves to block 306*g* to update queue and return back to block 306*a* because water 202 is not present in frame. At block 306*f*, if the circularity of the spot of light reflection 119 is greater than a threshold value then the method 300*a* moves to block 306*h* and the queue is updated because water 202 is present in frame.

At block 308, it is determined whether water 202 is present within the pit 118 of the elevator shaft 117 in response to the reflected electromagnetic wave 222*b*.

FIG. 3*b* shows a flow chart of a method 300*b* of determining whether water 202 is present within the pit 118 in response to the reflected electromagnetic wave 222*b*. In the example of FIG. 3*b* the electromagnetic wave detector 210 is a camera configured to detect light. In an embodiment, the method 300*b* may be performed by detection algorithm 256. The method 300*b* analyzes a queue of frames that were individually analyzed in FIG. 3*a* and method 300*a*.

At block 308*a*, detection results of method 300*a* are obtained from the detection algorithm 256. At block 308*b*, if water 202 is not detected then the method 300*b* moves to block 308*d* to save results as "Not detected" in a queue. The number of frames analyzed within the queue is configurable. For example, the detection algorithm 256 may analyze 50 frames in a queue or 100 frames in a queue. At block 308*b*, if water 202 is detected then the method 300*b* moves to block 308*c* and the results are saved as detected in the FIFO queue. At block 308*e*, if the FIFO queue is not full then the method 300*b* moves to block 308*a*. At block 308*e*, if the FIFO queue is full then the method 300*b* moves to block 308*f*. At block 308*f*, is check whether the detected frames in the FIFO queue are greater than a threshold limit (e.g., 50%). At block 308*f*, if the detected frames in the FIFO queue are not greater than a threshold limit then the method 300*b* moves to block 308*g* and a notification is transmitted to notify the absence of water 202. At block 308*h*, if the detected frames in the FIFO queue are greater than a threshold limit then the method 300*b* moves to block 308*h* and a notification is transmitted to notify the presence of water 202.

The method 300 may further comprise: transmitting a notification 270 to a computing device 280 in response to determining whether water 202 is present within the pit 118 of the elevator shaft 117 in response to the reflected electromagnetic wave 222*b*. The notification 270 may also be transmitted to the controller 115 of the elevator system 101 instruct the controller 115 to adjust operation of the elevator system 101. For example, the operation adjustment may include a command instructing the controller 115 to stop operation of the elevator system 101 or adjust service landings 125 of the elevator system 101. The method 300 may also comprise: activating an alarm 282 on the computing device 282 in response to the notification 270. The alarm 282 may be resent automatically (e.g., through detection by the electromagnetic wave detector 210) or manually (e.g., by a building manager or mechanic).

While the above description has described the flow process of FIG. 3 in a particular order, it should be appreciated that unless otherwise specifically required in the attached claims that the ordering of the steps may be varied.

As described above, embodiments can be in the form of processor-implemented processes and devices for practicing those processes, such as processor. Embodiments can also be in the form of computer program code containing instructions embodied in tangible media, such as network cloud storage, SD cards, flash drives, floppy diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes a device for practicing the embodiments. When implemented on a general-purpose microprocessor, the computer program code segments configure the microprocessor to create specific logic circuits.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of detecting water within a pit of an elevator shaft, the method comprising:
   emitting an electromagnetic wave from an electromagnetic wave source towards a bottom of an elevator shaft, wherein the electromagnetic wave is light;
   detecting a reflected electromagnetic wave of the electromagnetic wave using an electromagnetic wave detector; and
   determining whether water is present within the pit of the elevator shaft in response to the reflected electromagnetic wave;
   wherein determining whether water is present within the pit includes:
   detecting a spot of reflection of the light off a surface;
   determining a circularity of the spot of light reflection; and
   determining whether water is present within the pit of the elevator shaft in response to the circularity of the spot of light reflection;
   wherein determining whether water is present within the pit of the elevator shaft in response to the reflected electromagnetic wave further comprises comparing the reflected electromagnetic wave to the electromagnetic wave emitted from the electromagnetic wave source.

2. The method of claim 1, wherein determining whether water is present within the pit of the elevator shaft in response to the reflected electromagnetic wave further comprises:
   comparing the reflected electromagnetic wave to stored reflected electromagnetic waves.

3. The method of claim 1, further comprising:
   transmitting a notification to a computing device in response to whether water is present within the pit of the elevator shaft.

4. The method of claim 3, further comprising:
   activating an alarm on the computing device in response to the notification.

5. The method of claim 1, wherein the electromagnetic wave is infrared light.

6. The method of claim 1, wherein the electromagnetic wave source is a light source and the electromagnetic wave detector is a camera.

7. A method of detecting water within a pit of an elevator shaft, the method comprising:
   emitting an electromagnetic wave from an electromagnetic wave source towards a bottom of an elevator shaft, wherein the electromagnetic wave is light;
   detecting a reflected electromagnetic wave of the electromagnetic wave using an electromagnetic wave detector; and
   determining whether water is present within the pit of the elevator shaft in response to the reflected electromagnetic wave;
   wherein determining whether water is present within the pit includes:
   detecting a spot of reflection of the light off a surface;
   determining a circularity of the spot of light reflection; and
   determining whether water is present within the pit of the elevator shaft in response to the circularity of the spot of light reflection;
   wherein the electromagnetic wave is visible light.

8. A water detection system for detecting water within a pit of an elevator shaft, the water detection system comprising:
   an electromagnetic wave source configured to emit an electromagnetic wave towards a bottom of an elevator shaft, wherein the electromagnetic wave is light;
   an electromagnetic wave detector configured to detect a reflected electromagnetic wave of the electromagnetic wave; and
   a controller configured to determine whether water is present within the pit of the elevator shaft in response to the reflected electromagnetic wave;
   wherein the controller is configured to detect a spot of reflection of the light off a surface and determine a circularity of the spot of light reflection and determine whether water is present within the pit of the elevator shaft in response to the circularity of the spot of light reflection;
   wherein the controller determines whether water is present within the pit of the elevator shaft by comparing the reflected electromagnetic wave to the electromagnetic wave emitted from the electromagnetic wave source.

9. The water detection system of claim 8, wherein the controller may determine whether water is present within the pit of the elevator shaft by: comparing the reflected electromagnetic wave to stored reflected electromagnetic waves.

10. The water detection system of claim 8, wherein the controller is configured to transmit a notification to a computing device in response to whether water is present within the pit of the elevator shaft.

11. The water detection system of claim 10, wherein the controller is configured to activate an alarm on the computing device in response to the notification.

12. The water detection system of claim 8, wherein the electromagnetic wave is infrared light.

13. The water detection system of claim 8, wherein the electromagnetic wave source is a light source and the electromagnetic wave detector is a camera.

14. A water detection system for detecting water within a pit of an elevator shaft, the water detection system comprising:
   an electromagnetic wave source configured to emit an electromagnetic wave towards a bottom of an elevator shaft, wherein the electromagnetic wave is light;
   an electromagnetic wave detector configured to detect a reflected electromagnetic wave of the electromagnetic wave; and
   a controller configured to determine whether water is present within the pit of the elevator shaft in response to the reflected electromagnetic wave;
   wherein the controller is configured to detect a spot of reflection of the light off a surface and determine a circularity of the spot of light reflection and determine whether water is present within the pit of the elevator shaft in response to the circularity of the spot of light reflection;
   wherein the electromagnetic wave is visible light.

* * * * *